United States Patent [19]

Okitsu et al.

[11] 4,431,757
[45] Feb. 14, 1984

[54] FAST SETTING ADHESIVE COMPOSITION

[75] Inventors: Toshinao Okitsu, Tokyo; Tomio Uchida, Urawa, both of Japan

[73] Assignee: Konishi Co., Ltd., Osaka, Japan

[21] Appl. No.: 399,735

[22] Filed: Jul. 19, 1982

[51] Int. Cl.$^3$ .......................... C08L 7/02; C08L 9/00; C08J 3/02
[52] U.S. Cl. ........................................ 524/25; 524/26; 524/501; 524/502; 524/512; 524/514; 524/47; 156/328; 156/330; 156/330.9; 156/331.5; 156/336; 156/338; 525/192; 525/194; 523/402; 523/403
[58] Field of Search ................ 524/17, 21, 25, 26, 524/47, 501, 502, 512, 514; 156/327, 328, 330.9, 331.5, 331.9, 336, 338, 330; 525/192, 194; 523/402, 403

[56] References Cited

U.S. PATENT DOCUMENTS

| 2,754,240 | 7/1956 | Kinney | 524/26 |
| 2,931,845 | 4/1960 | Lehmann et al. | 524/25 |
| 2,987,492 | 6/1961 | Pinder | 524/502 |
| 3,375,121 | 3/1968 | Bildusas | 524/25 |
| 4,126,595 | 11/1978 | Martorano et al. | 524/512 |
| 4,279,959 | 7/1981 | Falgiatore et al. | 524/512 |
| 4,350,723 | 9/1982 | Sugimura et al. | 524/501 |

OTHER PUBLICATIONS

"Second-Generation Acrylic Adhesives", Adhesives Age, Sep. 1976.
M. M. Renfrew et al., "Coatings of Polyamide and Epoxy Resin Blends", Industrial & Eng. Chem., vol. 46, No. 10 pp. 2226-2232.
G. F. Baxter et al., "A Fast-Curing Phenolic Adhesive System" Forest Products Journal, vol. 23, No. 1, Jan. 1975, pp. 17-23.
R. E. Kreibich, "High Speed Adhesives for the Wood-Gluing Industry" Adhesives Age, Jan. 1974, pp. 26-33.
J. W. Prane, "Reactive Adhesives", Adhesives Age, Aug. 1980, pp. 35-37.

Primary Examiner—John Kight, III
Assistant Examiner—Nathan M. Nutter
Attorney, Agent, or Firm—Frishauf, Holtz, Goodman & Woodward

[57] ABSTRACT

The invention provides an adhesive composition of the two-part separate application type comprising solutions A and B. The solution A is an aqueous solution of a high polymer having an amide bond or an imide bond within the molecule, or an aqueous dispersion obtained by adding a rubber latex and/or synthetic resin emulsion to the aqueous solution of the high polymer. The solution B is an aqueous solution of a dialdehyde compound, or an aqueous solution or dispersion obtained by adding a crosslinking agent for crosslinking the high polymer of the solution A to the aqueous solution of the dialdehyde compound.

21 Claims, No Drawings

FAST SETTING ADHESIVE COMPOSITION

BACKGROUND OF THE INVENTION

The present invention relates to a fast setting adhesive composition of the two-part separate application type. More specifically, the present invention relates to a fast setting adhesive composition of the two-part separate application type comprising solutions A and B, wherein the solution A is an aqueous solution of a natural or synthetic high polymer having an amide bond (—CO—NH— structure) or an imide bond

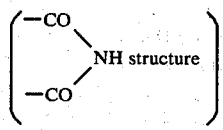

within the molecule, or an aqueous dispersion obtained by adding a rubber latex and/or synthetic resin emulsion to the aqueous solution of the natural or synthetic high polymer, and the solution B is an aqueous solution of a water-soluble dialdehyde compound, or an aqueous solution or dispersion obtained by adding a crosslinking agent for crosslinking the high polymer to the aqueous solution of the water-soluble dialdehyde compound. In order to bond two members together with an adhesive of this composition, the solution A is applied on one surface of one of the members, the solution B is applied to one surface of the other member, the two surfaces are brought into contact, and both members are pressed together. The adhesive composition allows fast setting with the excellent initial green bonding strength such that the two surfaces are bonded to each other with a significant strength within a few minutes.

In the lumber industry, there has been recently proposed to perform continuous mass-production with a conveyor system. In view of such a proposal, a fast setting adhesive has been desired. Although a cyanoacrylate-type instantaneous adhesive may be used, it is too costly. A fast setting adhesive of the two-part separate application type has long been commercially available which contains a urea resin-type adhesive as component A and a mixture of a strong acid such as phosphoric acid with an aqueous solution of a high polymer such as polyvinyl alcohol (PVA) as component B. However, the strong acid accelerates aging of the urea resin and degrades the strength of the wood material. Accordingly, this type of adhesive is not widely accepted.

The present inventors have previously proposed a gel composition comprising an aqueous solution of a mixture of a high polymer having an amide bond or an imide bond within the molecule with a dialdehyde compound such as glyoxal, wherein the gel composition turns into a sol like a glue when heated to a temperature of 70° to 90° C. and it turns into a gel when cooled to 40° to 50° C. A water-soluble high polymer having such a bond can be a water-soluble protein such as casein which has an amide bond within the molecule (Japanese Patent Publication No. 55-17066), or a high polymer having a maleinimide bond within the molecule (Japanese Patent Publication No. 55-17057). The gel compositions which are reversible under heating as described above can be handled in a similar manner as a glue and may be effectively used as fast setting adhesives. However, these gel compositions must be heated to 70° to 90° C. when it is used, and may not be easily mixed with a rubber latex or a synthetic resin emulsion so that they are poor in water resistance.

SUMMARY OF THE INVENTION

It is an object of the present invention to provide a fast setting adhesive which eliminates the drawbacks of the prior art adhesives and which does not require heating for bonding in view of energy conversion, which is easy to handle and to work with, and which sets fast at room temperature.

It is another object of the present invention to provide a fast setting adhesive of the two-part separate application type comprising an aqueous solution of a high polymer having an amide bond or an imide bond within the molecule, and an aqueous solution of a dialdehyde compound, wherein the solutions gel when they are separately applied to the surfaces of two members to be bonded and the two members are then bonded together at room temperature.

Although the prior art gel composition as described above may not be mixed with other components such as a rubber latex or synthetic resin emulsion, a two-part system type adhesive of the present invention allows mixing of such components so that the resiliency or water resistance of the set film may be improved as needed. Furthermore, when the adhesive is of a two-part system type, the content of the dialdehyde compound such as glyoxal can be increased, so that the gel strength may be improved over that of the prior art gel composition as described above and the initial green bonding strength may be improved. Since the fast setting adhesive of the two-part separate application type does not contain any strong acid, the wood is not degraded. Furthermore, a crosslinking agent may be added to the aqueous solution of the dialdehyde compound, so that the crosslinking process of the high polymer may be proceeded simultaneously as the gelation process.

In order to achieve the above and other objects of the present invention, there is provided a fast setting adhesive composition of the two-part separate application type comprising solutions A and B, wherein the solution A is an aqueous solution of a natural or synthetic high polymer having an amide bond (—CO—NH— structure) or an imide bond

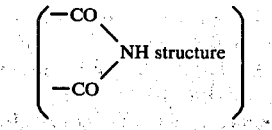

within a molecule, or an aqueous dispersion obtained by adding a rubber latex and/or synthetic resin emulsion to the aqueous solution of the natural or synthetic high polymer, an upper limit of a solid content of the rubber latex and/or synthetic resin emulsion being 10 parts by weight based on 1 part by weight of a solid content of the aqueous solution of the natural or synthetic high polymer, and the solution B is an aqueous solution of a water-soluble dialdehyde compound, or an aqueous solution or dispersion obtained by adding a crosslinking agent for crosslinking the high polymer to the aqueous solution of the water-soluble dialdehyde compound, an upper limit of an amount of the crosslinking agent added being 10 parts by weight based on 1 part by weight of the dialdehyde compound contained in the aqueous solution of the water-soluble dialdehyde compound. In order to bond two surfaces together with an adhesive of this composition, the solution A is applied on one surface of one of the members, the solution B is applied to one surface of the other member, and the two surfaces are brought into contact, and both members are pressed together.

DETAILED DESCRIPTION OF THE PREFERRED EMBODIMENTS

The present invention will now be described in more detail.

Examples of the natural or synthetic high polymer having an amide bond (—CO—NH— structure) or an imide bond

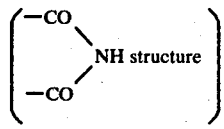

within the molecule for the solution A of the present invention may include a synthetic high polymer having a maleinimide group within the molecule such as a multicomponent copolymerization product of an $\alpha,\beta$-unsaturated compound with maleinimide, or a natural high polymer having an amide bond within the molecule such as a water-soluble protein.

If one component of the multicomponent copolymerization product having a maleinimide group within the molecule is an unsaturated compound which is capable of forming a carboxyl group such as maleic anhydride, the resultant copolymer is rendered soluble in water and the bonding performance is improved. The aqueous solution of such a high polymer may be prepared by simply dissolving it in water or adding a basic substance to it and dissolving the resultant mixture in water.

The multicomponent copolymerization product may include a vinyl acetate-maleic anhydride-maleinimide terpolymer, a styrene-maleic anhydride-maleinimide terpolymer, an isobutylene-maleic anhydride-maleinimide terpolymer, a vinyl methyl ether-maleinimide copolymer, and a vinylpyrrolidone-maleinimide copolymer. These multicomponent copolymerization products may be used singly or in admixture with each other.

It is also possible to react ammonia with a copolymer such as a styrene-maleic anhydride copolymer or an isobutylene-maleic anhydride, and converting part of maleic anhydride within the molecule to maleinimide.

Although various types of water-soluble proteins may be used according to the present invention, a protein which is soluble in alkaline water is preferably used. Examples of such proteins which are readily available may include milk protein (casein), soybean protein, wheat protein, and petroleum protein. These proteins may be used singly or in admixture with each other.

The aqueous solution containing 5 to 50% by weight (to be referred to as % hereinafter unless otherwise specified) of the natural or synthetic high polymer is used in the present invention. The homogeneous aqueous solution may be readily obtained if heated to 60° to 80° C. as needed. Examples of the basic substance to render the high polymer soluble in water may include an alkaline salt of a weak acid such as a hydroxide of an alkali metal, ammonium hydroxide, a carbonate of an alkali metal, ammonium carbonate, ammonium phosphate and borax; a hydroxide of an alkaline earth metal; and basic organic compound such as ethanolamines and morpholine.

The solution A of the present invention may be a mixture of an aqueous solution of a high polymer having an amide bond or an imide bond within the molecule with a rubber latex and/or synthetic resin emulsion. A rubber latex and/or synthetic resin emulsion is preferably used which improves the adhesion performance such as resiliency or water resistance of the adhesive set, which may not gel or separate from the rest of the components during mixing, and which has a film-forming ability and a satisfactory bonding strength. Examples of the rubber latex may include aqueous latices of a styrene-butadiene synthetic rubber, an acrylonitrile-butadiene synthetic rubber, a chloroprene synthetic rubber, and natural rubber; and carboxylic modified rubber latices thereof.

Examples of the synthetic resin emulsion may include emulsions of a homopolymer of a vinyl-type monomer such as vinyl acetate, acrylic ester, and methacrylic ester; or emulsions of a copolymer of the vinyl-type monomer such as an ethylene-vinyl acetate copolymer emulsion.

One or more of these rubber latices or synthetic resin emulsions having a solid content of 40 to 60% are usually used for the purpose of the present invention.

The rubber latex and/or synthetic resin emulsion is mixed with the aqueous solution of the high polymer having an amide bond or an imide bond within the molecule such that the upper limit of the solid content of the rubber latex and/or synthetic resin emulsion is 10 parts by weight based on 1 part by weight of the solid content of the aqueous solution. If the mixing ratio of the rubber latex and/or synthetic resin emulsion is too high, the gel strength of the gel is impaired which is formed upon contact between the high polymers having the amide bond or the imide bond within the molecule in the solution A with the dialdehyde compound such as glyoxal in the solution B. If the gel strength is impaired, desired fast setting property may not be obtained, and the initial green bonding strength and final bonding strength become unsatisfactory.

A filler may also be added to the solution A for the purpose of increasing the amount and reinforcing the strength. Examples of such a filler may include calcium carbonate, kaolin, barite, wood meals and vegetable grain, which may be added in proper amounts depending upon the applications of the adhesive.

In addition to the components as described above, the solution A of the present invention may further include a plasticizer, a colorant, and other additives. The crosslinking agent may also be added to the solution A, taking into consideration the pot life of the mixture of the solution A and the crosslinking agent.

Meanwhile, examples of the water-soluble dialdehyde compound for the solution B of the present invention may include glyoxal, malondialdehyde, succindialdehyde, glutaric dialdehyde, pimelic dialdehyde, and suberic dialdehyde. Glyoxal is particularly preferable. The 2 to 50% aqueous solution of such a water-soluble dialdehyde compound is usually used in the present invention. The aqueous solution may contain one or more of such water-soluble dialdehyde compounds.

The solution B may be an aqueous solution or an aqueous dispersion of such a water-soluble dialdehyde compound which further contains a crosslinking agent which is capable of crosslinking with a functional group such as a carboxyl group of the high polymer in the solution A. When such a crosslinking agent is added to the solution B, gelation of the solution A caused by the dialdehyde compound progresses simultaneously with crosslinking by this crosslinking agent. Therefore, a crosslinking agent which may not react with the dialdehyde compound in the solution B is preferable. Examples of such a crosslinking agent may include a hydrophilic polyepoxy compound such as a polyepoxide of a polyol.

The crosslinking agent as described above is added in an amount such that the upper limit thereof is 10 parts by weight based on 1 part by weight of the dialdehyde compound contained in the aqueous solution of the dialdehyde compound. If the crosslinking agent is added in too large an amount, the gel strength of the gel formed by the components in the solution A with the dialdehyde compound is impaired, resulting in unsatisfactory setting time and initial green bonding strength.

If the crosslinking agent is added to the dialdehyde compound, a desired fast setting property may be obtained due to gelation, and desirable water resistance and heat resistance after setting may be obtained due to crosslinking.

The solution B of the present invention may further include a colorant, a surfactant, a viscosity controlling agent and other additives if addition of such additives may not impair the effect of the dialdehyde compound.

With the fast setting adhesive composition of the two-part separate application type of the present invention, the solution A is applied to one surface of, for example, a wood piece and the solution B is applied to one surface of the other piece of, for example, a wood piece. The two surfaces are opposed to each other and the pieces are pressed at room temperature for 1 to 5 minutes. Upon lapse of this short time a considerably high bonding strength is obtained. The pieces are then released from pressure, and thereafter left to stand for some time, thereby curing the adhesive. As a result, a satisfactory final bonding strength is obtained. With conventional aqueous adhesives, the pieces must be pressed for a relatively long period of time to obtain a satisfactory final bonding strength. However, since a fast setting adhesive composition of the present invention has a satisfactory fast setting property, bonding with a satisfactory final bonding strength may be obtained by leaving to stand and curing after pressing for a short period of time.

With the fast setting adhesive composition of the present invention, the solution B is applied to one surface of one member in advance and then dried. Then, the solution A is applied to one surface of another member, and the two surfaces are brought into contact. For this reason, the fast setting adhesive composition of the present invention may be handled in a similar manner as that of a one-component adhesive, and facilitates continuous mass-production with a conveyor system in wood working or the like.

The fast setting adhesive composition of the present invention may be used for bonding various types of surfaces including wood materials such as wood, chip boards, or hardboards; inorganic materials such as slates or calcium silicate plates; plastic materials such as melamine resin decorative sheets or Bakelite; and paper materials such as corrugated boards, paper boards, or kraft paper sheets. Thus, plane or edge bonding of flush panels, fancy plywood, pre-fab panels, and laminated wood; and jointing such as tenon, dowel, miter, butt, or corner wood pad may be achieved at room temperature with less labor and energy and in a short time. The role that the fast setting adhesive composition of the present invention plays in energy conservation is thus significant.

The present invention will now be described by way of its examples. The examples are presented below only for the purpose of explaining the present invention in detail and may not be understood in a restrictive manner.

EXAMPLE 1

An isobutylene-maleic anhydride copolymer (Trade name: ISOBAM 04 manufactured by KURARAY ISOPRENE CHEMICAL CO., LTD.) was heated to 180° C. in an ammonium atmosphere to provide an isobutylene-maleinimide-maleic anhydride terpolymer (to be referred to as an acid imide terpolymer for brevity hereinafter) with the molar ratio being 2:1:1.

Into a vessel were charged 40 parts by weight of the acid imide terpolymer, 7 parts by weight of commercial 25% aqueous ammonia, and 80 parts by weight of water. The resultant mixture was heated to 85° C. and was stirred for 2 hours to provide a homogeneous aqueous solution of the acid imide terpolymer (solid content: 33%). After the aqueous solution was cooled to room temperature, it was mixed with a polyvinyl acetate emulsion (Trade name: BOND CH 18; 41% solid content; manufactured by KONISHI CO., LTD.) and calcium carbonate (Trade name: BF100 manufactured by BIHOKU FUNKA KOGYO K.K.), in different ratios which are shown in Table 1. The resultant mixture was well stirred to provide a viscous solution as the solution A.

Meanwhile, a 15% glyoxal aqueous solution was prepared as the solution B.

These solutions A and B were subjected to the compression shear bonding strength test by the method in accordance with the "Testing methods for strength properties of adhesives in shear by compression loading" of JIS (Japanese Industrial Standard) K-6852. Samples were pieces of birch trees, each having dimensions of $25 \times 30 \times 10$ mm. The solution A was applied to one sample piece at a rate of about 200 g/m$^2$, and the solution B was applied to the other sample piece at a rate of about 40 g/m$^2$. These samples were brought into contact and then pressed together at a pressure of about 5 kg/cm$^2$. After each pressing time in Table 1 below, the sample pieces were released from pressure and were subjected to the compression shear bonding strength test after curing 5 minutes and 24 hours, respectively. The bonding operation, curing and measurements were all performed in an atmosphere at 20° C.

For the purpose of comparison (Comparative Example 1), the polyvinyl acetate emulsion type adhesive (BOND CH 18) alone was applied to one sample piece at a rate of about 200 g/m$^2$, and the adhesive coating was opposed to another sample to which the solution B was not applied. The sample pieces were immediately pressed together at a pressure of about 5 kg/cm$^2$, and was subjected to the same test. The results of the test are shown in Table 1 below.

TABLE 1

| | Amount of Solution A (Parts by weight) | | | Mixing Ratio of Solid Content of Acid Imide Terpolymer Aqueous Solution to That of Polyvinyl Acetate Emulsion in Solution A | Curing Time (After Releasing Pressure) | Compression Shear Bonding Strength (kg/cm²) (Pressing Time) | | | | |
|---|---|---|---|---|---|---|---|---|---|---|
| | Acid Imide Terpolymer Aqueous Solution (Solid Content: 33%) | Polyvinyl Acetate Emulsion (Solid Content: 41%) | Calcium Carbonate (Filler) | | | 30 sec | 1 min | 2 min | 5 min | 10 min |
| Example 1 | | | | | | | | | | |
| a | 10 | — | 2 | 1:0 | 5 min | 16 | 22 | 26 | 31 | 41 |
| | | | | | 24 hrs | 154 | 151 | 174 | 192 | 185 |
| | | | | | | (0) | (0) | (0) | (10) | (10) |
| b | 10 | 8 | 3 | 1:1 | 5 min | 26 | 29 | 35 | 46 | 61 |
| | | | | | 24 hrs | 197 | 221 | 233 | 236 | 241 |
| | | | | | | (0) | (10) | (30) | (40) | (20) |
| c | 10 | 24 | 7 | 1:3 | 5 min | 22 | 24 | 28 | 42 | 52 |
| | | | | | 24 hrs | 185 | 188 | 196 | 240 | 237 |
| | | | | | | (0) | (10) | (30) | (40) | (50) |
| d | 10 | 40 | 10 | 1:5 | 5 min | 17 | 21 | 25 | 37 | 54 |
| | | | | | 24 hrs | 158 | 180 | 188 | 202 | 221 |
| | | | | | | (0) | (0) | (10) | (30) | (10) |
| e | 10 | 56 | 13 | 1:7 | 5 min | 13 | 19 | 21 | 32 | 45 |
| | | | | | 24 hrs | 101 | 152 | 171 | 168 | 187 |
| | | | | | | (0) | (0) | (0) | (10) | (10) |
| f | 10 | 80 | 18 | 1:10 | 5 min | 6 | 11 | 21 | 26 | 39 |
| | | | | | 24 hrs | 64 | 121 | 137 | 169 | 185 |
| | | | | | | (0) | (0) | (0) | (0) | (0) |
| Comparative Example 1 | Polyvinyl Acetate Emulsion (Solution B Not Applied) | | | 0:1 | 5 min | 4 | 9 | 15 | 24 | 45 |
| | | | | | 24 hrs | 48 | 55 | 99 | 132 | 209 |
| | | | | | | (0) | (0) | (0) | (0) | (0) |

Notes:
1. Measurements of bonding strength are mean values obtained with 5 samples.
2. Measurements in parentheses in the columns corresponding to the curing time of 24 hours indicate the wood failure in %.

In Table 1 above, the adhesive compositions of the two solutions A and B of the present invention are aqueous adhesives. However, even if pressing time is relatively short, satisfactory bonding strength can be obtained after curing in Example 1a (where the solution A contains only the acid imide terpolymer) and in Examples 1b to 1f (wherein the solution A contains both the acid imide terpolymer and the polyvinyl acetate emulsion). However, in Comparative Example 1 wherein bonding is attempted with the polyvinyl acetate emulsion type adhesive alone, satisfactory bonding strength is obtained only after a long pressing time.

EXAMPLE 2

To 127 parts by weight of the aqueous solution of acid imide terpolymer (solid content: 33%) prepared in the same manner as in Example 1 were added 200 parts by weight of the polyvinyl acetate emulsion (BOND CH 18) and 60 parts by weight of the calcium carbonate (BF100). The resultant mixture was well stirred to provide a viscous solution as the solution A. The mixing ratio of the solid content of the acid imide terpolymer aqueous solution to that of the polyvinyl acetate emulsion was about 1:2.

The aqueous solutions of glyoxal of respective concentrations in Table 2 were prepared as the solution B.

Using these solutions A and B and birch tree pieces as sample pieces, the solution A was applied to one sample piece at a rate of about 200 g/m² and the solution B was applied to another sample piece at a rate of about 40 g/m² in the same manner as in Example 1 above. These sample pieces were bonded together and measured for their compression shear bonding strength in the same manner as in Example 1. For the purpose of comparison (Comparative Example 2), the solution A was applied to one sample piece at a rate of about 200 g/m² and was bonded with another sample piece to which the solution B was not applied. The sample pieces were pressed together immediately thereafter. The measurement results are shown in Table 2 below.

TABLE 2

| | Glyoxal Content in Solution B (%) | Curing Time (After Releasing Pressure) | Compression Shear Bonding Strength (kg/cm²) (Pressing Time) | | | | |
|---|---|---|---|---|---|---|---|
| | | | 30 sec | 1 min | 2 min | 5 min | 10 min |
| Example 2 | | | | | | | |
| a | 2 | 5 min | 8 | 15 | 25 | 40 | 49 |
| | | 24 hrs | 68 | 94 | 135 | 193 | 196 |
| | | | (0) | (0) | (0) | (0) | (10) |
| b | 5 | 5 min | 16 | 26 | 34 | 46 | 54 |
| | | 24 hrs | 134 | 160 | 181 | 183 | 191 |
| | | | (0) | (0) | (10) | (0) | (10) |
| c | 10 | 5 min | 22 | 31 | 36 | 51 | 62 |
| | | 24 hrs | 152 | 197 | 204 | 195 | 203 |
| | | | (0) | (0) | (20) | (10) | (20) |
| d | 20 | 5 min | 24 | 27 | 29 | 41 | 53 |
| | | 24 hrs | 221 | 213 | 216 | 229 | 214 |

TABLE 2-continued

| Glyoxal Content in Solution B (%) | Curing Time (After Releasing Pressure) | Compression Shear Bonding Strength (kg/cm²) (Pressing Time) | | | | |
|---|---|---|---|---|---|---|
| | | 30 sec | 1 min | 2 min | 5 min | 10 min |
| | | (0) | (0) | (30) | (20) | (50) |
| e    40 | 5 min | 14 | 18 | 22 | 28 | 39 |
| | 24 hrs | 182 | 197 | 200 | 220 | 211 |
| | | (40) | (50) | (60) | (40) | (60) |
| Comparative Example 2 | 5 min | 1 | 2 | 4 | 12 | 18 |
| | 24 hrs | 29 | 57 | 79 | 102 | 139 |
| | | (0) | (0) | (0) | (0) | (0) |

Notes:
1. Measurements of bonding strength are mean values obtained with 5 samples.
2. Measurements in parentheses in the columns corresponding to the curing time of 24 hours indicate the wood failure in %.

Referring to Table 2 above, when the adhesive compositions of Examples 2a to 2e (wherein both the solutions A and B are used) are compared with Comparative Example 2 (wherein the solution A alone is used), it is seen that application of the solution B allows a satisfactory bonding strength after a short pressing time. Furthermore, a satisfactory bonding strength is obtained with the concentration of glyoxal varying within a wide range.

EXAMPLE 3

The solution A prepared in the same manner as in Example 2 was used. A 25% aqueous solution of glutaric dialdehyde was prepared as the solution B. Using the birch tree pieces as sample pieces, the solution A was applied to one sample piece at a rate of about 200 g/m², and the solution B was applied to another sample piece at a rate of about 40 g/m². The sample pieces were bonded together and measured for its compression shear bonding strength in the same manner as in Example 1. The obtained results are shown in Table 3 below.

For the purpose of comparison (Comparative Example 3), the polyvinyl acetate emulsion type adhesive (BOND CH 18) alone was applied at a rate of about 200 g/m² to one sample piece as the solution A, and was bonded with another sample piece to which the solution B was not applied. The obtained results with the sample pieces are also shown in Table 3 below.

TABLE 3

| | Curing Time (After Releasing Pressure) | Compression Shear Bonding Strength (kg/cm²) (Pressing Time) | | | | |
|---|---|---|---|---|---|---|
| | | 30 sec | 1 min | 2 min | 5 min | 10 min |
| Example 3 | 5 min | 28 | 33 | 45 | 51 | 67 |
| | 24 hrs | 163 | 201 | 209 | 229 | 246 |
| | | (0) | (30) | (20) | (30) | (40) |
| Comparative Example 3 | 5 min | 4 | 9 | 15 | 24 | 45 |
| | 24 hrs | 48 | 55 | 99 | 132 | 209 |
| | | (0) | (0) | (0) | (0) | (0) |

Notes:
1. Measurements of bonding strength are mean values obtained with 5 samples.
2. Measurements in parentheses in the columns corresponding to the curing time of 24 hours indicate the wood failure in %.

It is seen from Table 3 that better bonding strength is obtained with the adhesive composition of the present invention than with Comparative Example 3 even if the pressing time is short.

EXAMPLE 4

Into a vessel were charged 100 parts by weight of casein (casein hydrochloride manufactured by BUTTER FACTORY CO., LTD.), 14 parts by weight of sodium tertiary phosphate having twelve crystal water molecules, 6 parts by weight of sodium fluoride, and 12 parts by weight of calcium hydroxide. The mixture was well stirred and was mixed with 250 parts by weight of water. The resultant mixture was heated to 65° C. under stirring for 20 minutes to provide a homogeneous viscous solution as the solution A.

A 15% aqueous solution of glyoxal was prepared as the solution B.

Using birch tree pieces as sample pieces, the solution A was applied to one sample piece at a rate of about 200 g/m² and the solution B was applied to another sample piece at a rate of about 40 g/m², in the same manner as in Example 1. The sample pieces were bonded together and measured for its compression shear bonding strength in the same manner as in Example 1.

For the purpose of comparison (Comparative Example 4), the solution A was applied to one sample piece and was bonded to another sample piece to which the solution B was not applied. The bonded sample pieces were measured for its compression shear bonding strength. The obtained results are shown in Table 4 below.

TABLE 4

| | Curing Time (After Releasing Pressure) | Compression Shear Bonding Strength (kg/cm²) (Pressing Time) | | | | |
|---|---|---|---|---|---|---|
| | | 30 sec | 1 min | 2 min | 5 min | 10 min |
| Example 4 | 5 min | 6 | 8 | 11 | 13 | 22 |
| | 24 hrs | 74 | 82 | 117 | 128 | 137 |
| | | (0) | (0) | (10) | (10) | (10) |
| Comparative Example 4 | 5 min | 2 | 4 | 6 | 9 | 16 |
| | 24 hrs | 47 | 62 | 81 | 110 | 126 |
| | | (0) | (0) | (0) | (0) | (10) |

Notes:
1. Measurements of bonding strength are mean values obtained with 5 samples.
2. Measurements in parentheses in the columns corresponding to the curing time of 24 hours indicate the wood failure in %.

Referring to Table 4 above, when the adhesive compositions of Examples 4 (wherein both the solutions A and B are used) are compared with Comparative Example 4 (wherein the solution A alone is used), it is seen that application of the solution B allows a satisfactory bonding strength after a short pressing time.

EXAMPLE 5

To 127 parts by weight of the acid imide terpolymer aqueous solution (solid content: 33%) prepared in the same manner as in Example 1 were added 170 parts by weight of a styrene-butadiene copolymer rubber latex (Trade name: KS 207; 48% solid content; manufactured by SUMITOMO NAUGATUCK CO., LTD.), and 60 parts by weight of calcium carbonate (BF100). The resultant mixture was well stirred to prepare a viscous solution as the solution A. The mixing ratio of the solid content of the acid imide terpolymer aqueous solution to that of the styrene-butadiene copolymer rubber latex is about 1:2.

Meanwhile, a 15% aqueous solution of glyoxal was prepared as the solution B.

One sample piece was a birch tree piece which had dimensions of 25×30×10 mm, while the other sample piece was a slate which had dimensions of 25×30×5 mm, or was a melamine resin decorative sheet (manufactured by SUMITOMO BAKELITE CO., LTD.) which had dimensions of 25×30×1.2 mm. The solution A was applied to the sample piece of birch tree at a rate of about 200 g/m$^2$, while the solution B was applied to the sample piece of slate at a rate of about 100 g/m$^2$ and to the sample piece of the melamine resin decorative sheet at a rate of about 30 g/m$^2$. The birch/slate sample and birch/melamine resin decorative sheet sample were bonded together and measured for their compression shear bonding strength in the same manner as in Example 1.

For the purpose of comparison (Comparative Example 5), a modified polyvinyl acetate emulsion type adhesive (Trade name: BOND TS$_3$; 62% solid content; manufacture by KONISHI CO., LTD.) was applied at a rate of 200 g/m$^2$ for bonding a birch tree piece with a slate. A polyvinyl acetate emulsion type adhesive (BOND CH 18) was applied at a rate of about 200 g/m$^2$ for bonding a birch tree piece with a melamine resin decorative sheet. These two sets (Comparative Examples 5a and 5b) of sample pieces were bonded together and measured for their compression shear bonding strength in the same manner as in Comparative Example 1. The obtained results are shown in Table 5 below.

with the Comparative Example, a satisfactory bonding strength may not be obtained unless the pressing time is prolonged.

EXAMPLE 6

The solution A prepared in the same manner as in Example 5 was used. Meanwhile, glyoxal and a water-soluble epoxy resin (diethyleneglycol diglycidyl ether) were mixed in the mixing ratios (by weight) shown in Table 7 below to prepare the solution B.

Using birch tree pieces as sample pieces, the adhesive composition comprising the two solutions A and B was used to prepare the bonded sample pieces as in Example 1 (the solution A applied at a rate of about 200 g/m$^2$, and the solution B applied at a rate of about 40 g/m$^2$) which was measured for its compression shear bonding strength. Using same sample pieces bonded under the respective sets of conditions in Table 6 (with the solutions A and B applied in the same amounts as described above), the water resistance test was performed under various treatment conditions in accordance with the "Testing method for resistance of adhesive bond to water or moisture" of JISK-6857 and bonded sample pieces were measured for their compression shear bonding strength.

TABLE 6

|  | Condition a | Condition b | Condition c |
|---|---|---|---|
| Adhering Conditions |  |  |  |
| Pressing Time | 1 min | 1 min | 5 min |
| Curing Time (After Releasing Pressure) | 72 hrs | 72 hrs | 72 hrs |
| Treatment Conditions |  |  |  |
| Immersion Time in Water at Room Temperature | 72 hrs | — | — |
| Immersion Time in Warm Water at 60° C. | — | 3 hrs | 5 hrs |
| Immersion Time in Water at Room Temperature (Cooling) | — | 10 min | 24 hrs |

TABLE 5

| Sample |  | Curing Time (After Releasing Pressure) | Compression Shear Bonding strength (kg/cm$^2$) (Pressing Time) | | | | |
|---|---|---|---|---|---|---|---|
|  |  |  | 30 sec | 1 min | 2 min | 5 min | 10 min |
| Example 5 |  |  |  |  |  |  |  |
| a | Birch/Slate | 5 min | 19 | 22 | 25 | 28 | 39 |
|  |  | 24 hrs | 87 | 90 | 92 | 106 | 101 |
|  |  |  | (70) | (100) | (90) | (80) | (90) |
| b | Birch/Melamine Resin Decorative Sheet | 5 min | 8 | 13 | 15 | 19 | 20 |
|  |  | 24 hrs | 102 | 99 | 103 | 101 | 102 |
|  |  |  | (80) | (80) | (90) | (100) | (100) |
| Comparative Example 5 |  |  |  |  |  |  |  |
| a | Birch/Slate | 5 min | 2 | 3 | 5 | 15 | 18 |
|  |  | 24 hrs | 52 | 59 | 69 | 77 | 78 |
|  |  |  | (30) | (20) | (40) | (70) | (90) |
| b | Birch/Melamine Resin Decorative Sheet | 5 min | 0 | 0 | 1 | 11 | 13 |
|  |  | 24 hrs | 29 | 37 | 34 | 48 | 59 |
|  |  |  | (0) | (0) | (0) | (0) | (0) |

Notes:
1. Measurements of bonding strength are mean values obtained with 5 samples.
2. Measurements in parentheses in the columns corresponding to the curing time of 24 hours indicate the wood failure in %.

It is seen from Table 5 above that a satisfactory bonding strength is obtained with the adhesive composition of the present invention for bonding different types of materials even if the pressing time is short. However, Measurement results under these conditions are shown in Table 7 below.

TABLE 7

| | Composition of Solution B | | | Compression Shear Bonding strength (kg/cm²) (Pressing Time) | | Water Resistance Test (Compression Shear Bonding Strength: kg/cm²) | | |
|---|---|---|---|---|---|---|---|---|
| | Content (Parts by Weight) in 100 Parts by Weight of Solution B | | Mixing Ratio of Glyoxal to Epoxy Resin | Curing Time (After Releasing Pressure) | | | | |
| | Glyoxal | Epoxy Resin | | | 1 min | 5 min | Condition a | Condition b | Condition c |
| Example 6 | | | | | | | | | |
| a | | 0 | 1:0 | 5 min | 28 | 42 | 24 | 0 | 0 |
|   |   |   |   | 24 hrs | 195 (30) | 203 (30) |   |   |   |
| b | | 10 | 1:1 | 5 min | 24 | 44 | 58 | 7 | 7 |
|   |   |   |   | 24 hrs | 200 (30) | 211 (50) |   |   |   |
| c | 10 | 20 | 1:2 | 5 min | 23 | 37 | 47 | 17 | 15 |
|   |   |   |   | 24 hrs | 185 (20) | 207 (40) |   |   |   |
| d | | 40 | 1:4 | 5 min | 21 | 34 | 51 | 22 | 26 |
|   |   |   |   | 24 hrs | 182 (20) | 234 (20) |   |   |   |
| e | 10 | 60 | 1:6 | 5 min | 23 | 34 | 45 | 26 | 31 |
|   |   |   |   | 24 hrs | 164 (0) | 223 (30) |   |   |   |
| f | 5 | 50 | 1:10 | 5 min | 18 | 30 | 43 | 20 | 34 |
|   |   |   |   | 24 hrs | 170 (0) | 206 (10) |   |   |   |

Notes:
1. Measurements of bonding strength are mean values obtained with 5 samples.
2. Measurements in parentheses in the columns corresponding to the curing time of 24 hours indicate the wood failure in %.

It is seen from Table 7 above that the adhesive composition of Example 6a comprising the two solutions A and B of the present invention exhibits a good water resistance under a condition a even if the solution B does not contain a water-soluble epoxy resin. With Examples 6b to 6f wherein the solution B contains not only glyoxal but also a water-soluble epoxy resin, bonding strength after curing (normal state) is not degraded with a short pressing time. Even if the pressure is released after a short pressing time, the epoxy resin used as the crosslinking agent acts effectively to improve the water resistance of the adhesive set under any of conditions a, b and c.

What we claim is:

1. A water-based fast setting adhesive composition of a two-part separate application type wherein said parts are not mixed with each other before use for forming a bond, said adhesive composition comprising solutions A and B, wherein solution A consists essentially of an aqueous solution of a natural or synthetic high polymer having an amide bond (—CO—NH— structure) or an imide bond

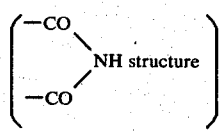

within the molecule, or an aqueous dispersion obtained by adding at least one substance selected from a rubber latex and a synthetic resin emulsion to the aqueous solution of the natural or synthetic high polymer, the solid content of said substance being up to 10 parts by weight based on 1 part by weight of the solid content of the aqueous solution of the natural or synthetic high polymer, and wherein solution B consists essentially of an aqueous solution of a water-soluble dialdehyde compound, or an aqueous solution or dispersion obtained by adding a crosslinking agent for crosslinking the high polymer to the aqueous solution of the water-soluble dialdehyde compound, the amount of the crosslinking agent added being up to 10 parts by weight based on 1 part by weight of the dialdehyde compound contained in the aqueous solution of the water-soluble dialdehyde compound.

2. A composition according to claim 1, wherein the natural or synthetic high polymer having the amide bond or the imide bond is one of a multicomponent copolymerization product obtained by copolymerizing an α,β-unsaturated compound and maleinimide and having a maleinimide group within the molecule, and a water-soluble protein having the amide bond within the molecule.

3. A composition according to claim 2, wherein the multicomponent copolymerization product is at least a member selected from the group consisting of a vinyl acetate-maleic anhydride-maleinimide terpolymer, a styrene-maleic anhydride-maleinimide terpolymer, an isobutylene-maleic anhydride-maleinimide terpolymer, a vinyl methyl ether-maleinimide copolymer, and a vinylpyrrolidone-maleinimide copolymer.

4. A composition according to claim 2, wherein the water-soluble protein is at least one member selected from the group consisting of milk protein, soybean protein, wheat protein and petroleum protein.

5. A composition according to claim 1, wherein the aqueous solution of the natural or synthetic high polymer is an aqueous solution containing 5 to 50% by weight of the natural or synthetic high polymer.

6. A composition according to claim 1, wherein the rubber latex is at least one member selected from the group consisting of latices of a styrene-butadiene synthetic rubber, an acrylonitrile-butadiene synthetic rubber, a chloroprene synthetic rubber, and natural rubber; and carboxylic modified rubber latices thereof.

7. A composition according to claim 1, wherein the synthetic resin emulsion is at least one member selected from the group consisting of a emulsion of a homopolymer of a vinyl-type monomer, and a emulsion of a copolymer of the vinyl-type monomer.

8. A composition according to claim 7, wherein the emulsion of the homopolymer is an emulsion of at least one member selected from the group consisting of homopolymers of vinyl acetate, acrylic ester, and methacrylic ester.

9. A composition according to claim 7, wherein the emulsion of the copolymer is an emulsion of an ethylene-vinyl acetate copolymer.

10. A composition according to claim 1, wherein the solid content of said substance is 40 to 60% by weight.

11. A composition according to claim 1, wherein the water-soluble dialdehyde compound is at least one member selected from the group consisting of glyoxal, malondialdehyde, succindialdehyde, glutaric dialdehyde, pimelic dialdehyde, and suberic dialdehyde.

12. A composition according to claim 1, wherein the aqueous solution of the water-soluble dialdehyde compound is an aqueous solution containing 2 to 50% by weight of the water-soluble dialdehyde compound.

13. A composition according to claim 1, wherein the crosslinking agent is a hydrophilic polyepoxy compound.

14. A composition according to claim 13, wherein the hydrophilic polyepoxy compound is a polyepoxide of a polyol.

15. A composition according to claim 1, wherein the aqueous solution of the natural or synthetic high polymer is an aqueous solution obtained by dissolving the natural or synthetic high polymer in water.

16. A composition according to claim 1, wherein the aqueous solution of the natural or synthetic high polymer is an aqueous solution obtained by adding a basic substance to the high polymer and dissolving a resultant mixture in water.

17. A composition according to claim 15 or 16, wherein the aqueous solution of the natural or synthetic high polymer is an aqueous solution obtained by heating an aqueous high polymer to 60° to 80° C. and dissolving the high polymer in water.

18. A composition according to claim 16, wherein the basic substance is at least one member selected from the group consisting of a hydroxide of an alkali metal, ammonium hydroxide, a carbonate of an alkali metal, ammonium carbonate, ammonium phosphate, borax, a hydroxide of an alkaline earth metal, ethanolamines, and morpholine.

19. A method of forming an adhesive bond between two materials using a water-based adhesive composition of a two-part separate application type, said adhesive composition comprising solutions A and B, wherein solution A consists essentially of an aqueous solution of a natural or synthetic high polymer having an amide bond (—CO—NH— structure) or an imide bond

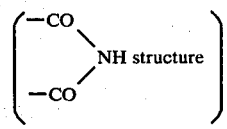

within the molecule, or an aqueous dispersion obtained by adding at least one substance selected from a rubber latex and a synthetic resin emulsion to the aqueous solution of the natural or synthetic high polymer, the amount of the solid content of said substance being up to 10 parts by weight based on 1 part by weight of the solid content of the aqueous solution of the natural or synthetic high polymer; and wherein solution B consists essentially of an aqueous solution of a water-soluble dialdehyde compound, or an aqueous solution or dispersion obtained by adding a crosslinking agent for crosslinking the high polymer to the aqueous solution of the water-soluble dialdehyde compound, the amount of the crosslinking agent being up to 10 parts by weight based on 1 part by weight of the dialdehyde compound contained in the aqueous solution of the water-soluble dialdehyde compound; said method comprising applying one of said solutions to the surface of a first material to be bonded; applying the other of said solutions to the surface of a second material to be bonded, contacting the resulting surfaces of said first and second materials at room temperature under pressure for a sufficient time to permit said solutions A and B to rapidly form a gel composition, whereby a semisolid glue line which exhibits a high initial green bonding strength is formed between said first and second materials.

20. A method of forming an adhesive bond between two materials using a water-based adhesive composition of a two-part separate application type, said adhesive composition comprising solutions A and B, wherein solution A consists essentially of an aqueous solution of a natural or synthetic high polymer having an amide bond (—CO—NH— structure) or an imide bond

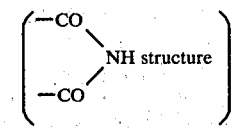

within the molecule, or an aqueous dispersion obtained by adding at least one substance selected from a rubber latex and a synthetic resin emulsion to the aqueous solution of the natural or synthetic high polymer; the amount of the solid content of said substance being up to 10 parts by weight based on 1 part by weight of the solid content of the aqueous solution of the natural or synthetic high polymer; and wherein solution B consists essentially of an aqueous solution of a water-soluble dialdehyde compound, or an aqueous solution or dispersion obtained by adding a crosslinking agent for crosslinking the high polymer to the aqueous solution of the water-soluble dialdehyde compound, the amount of the crosslinking agent added being up to 10 parts by weight based on 1 part by weight of the dialdehyde compound contained in the aqueous solution of the water-soluble dialdehyde compound; said method comprising applying solution B to the suface of a first material to be bonded; drying solution B applied to said first material and, when bonding of said bonding materials is actually to be performed, applying solution A to the surface of a second material to be bonded, and contacting the resulting surfaces of said first and second materials at room temperature under pressure for a time sufficient to permit solutions A and B to rapidly form a gel composition, whereby a semisolid glue line exhibiting a high initial green bonding strength is formed between said materials.

21. A method according to claim 20 further comprising storing said first material having dried solution B thereon prior to contacting said material with said second material having solution A thereon.

* * * * *